(12) United States Patent
Thomas et al.

(10) Patent No.: US 9,669,921 B2
(45) Date of Patent: Jun. 6, 2017

(54) ACTIVE AIRCRAFT PYLON NOISE CONTROL SYSTEM

(71) Applicant: The United States of America as represented by the Administrator of the National Aeronautics and Space Administration, Washington, DC (US)

(72) Inventors: Russell H. Thomas, Yorktown, VA (US); Michael J. Czech, Issaquah, WA (US); Alaa A. Elmiligui, Virginia Beach, VA (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 0 days.

(21) Appl. No.: 14/703,288

(22) Filed: May 4, 2015

(65) Prior Publication Data
US 2015/0232170 A1 Aug. 20, 2015

Related U.S. Application Data

(62) Division of application No. 13/214,481, filed on Aug. 22, 2011, now Pat. No. 9,022,311.
(Continued)

(51) Int. Cl.
*B64C 7/02* (2006.01)
*B64D 27/26* (2006.01)
*B64C 21/04* (2006.01)

(52) U.S. Cl.
CPC ............... *B64C 7/02* (2013.01); *B64C 21/04* (2013.01); *B64D 27/26* (2013.01); *B64C 2220/00* (2013.01)

(58) Field of Classification Search
CPC ....... B64C 21/04; B64C 2220/00; B64C 7/02; B64C 21/02; B64D 27/18; B64D 33/06; B64D 27/26
See application file for complete search history.

(56) References Cited

U.S. PATENT DOCUMENTS 4,917,336 A * 4/1990 Jacobs et al. ................. 244/207
6,820,410 B2 11/2004 Lair
(Continued)

FOREIGN PATENT DOCUMENTS

WO 2009107646 A1 9/2009
WO WO 2011104488 A9 * 12/2011

OTHER PUBLICATIONS

Steven J. Massey, Alaa A. Elmiligui, Craig A. Hunter, Russell H. Thomas, S. Paul Pao, and Vinod G. Mengle, "Computational Analysis of a Chevron Nozzle Uniquely Tailored for Propulsion Airframe Aeroacoustics," 12th AIAA/CEAS Aeroacuoustics Conferenence (27th AIAA Aeroacoustics Conference) May 8-10, 2006, Cambridge, Massachusetts.
(Continued)

*Primary Examiner* — Valentina Xavier
(74) *Attorney, Agent, or Firm* — Robin W. Edwards (57) ABSTRACT

An active pylon noise control system for an aircraft includes a pylon structure connecting an engine system with an airframe surface of the aircraft and having at least one aperture to supply a gas or fluid therethrough, an intake portion attached to the pylon structure to intake a gas or fluid, a regulator connected with the intake portion via a plurality of pipes, to regulate a pressure of the gas or fluid, a plenum chamber formed within the pylon structure and connected with the regulator, and configured to receive the gas or fluid as regulated by the regulator, and a plurality of injectors in communication with the plenum chamber to
(Continued)

actively inject the gas or fluid through the plurality of apertures of the pylon structure.

4 Claims, 6 Drawing Sheets

Related U.S. Application Data

(60) Provisional application No. 61/375,382, filed on Aug. 20, 2010.

(56) References Cited

U.S. PATENT DOCUMENTS

| | | |
|---|---|---|
| 2008/0272228 A1 | 11/2008 | Mengle et al. |
| 2010/0257865 A1 | 10/2010 | Mengle |
| 2011/0000181 A1* | 1/2011 | Oishi .................. B64C 7/02 60/39.5 |
| 2011/0155862 A1 | 6/2011 | Mengle |

OTHER PUBLICATIONS

Craig A. Hunter, Russell H. Thomas, K.S. Abdol-Hamid, S. Paul Pao, Alaa A. Elmiligui, and Steven J. Massey, "Computational Analysis of the Flow and Acoustic Effects of Jet-Pylon Interaction," 11th AIAA/CEAS Aeroacoustics Conference May 23-25, 2005, Monterey, California.

* cited by examiner

ACTIVE AIRCRAFT PYLON NOISE CONTROL SYSTEM

CROSS-REFERENCE TO RELATED APPLICATIONS

This patent application claims the benefit of priority to and is a divisional of U.S. patent application Ser. No. 13/214,481, filed Aug. 22, 2011, which claims the benefit of priority under 35 U.S.C. §119 to U.S. Provisional Patent Application No. 61/375,382, with a filing date of Aug. 20, 2010, the contents of the foregoing applications hereby incorporated by reference in their entirety.

ORIGIN OF THE INVENTION

The present invention was made in part by an employee of the United States Government and may be manufactured and used by or for the Government of the United States of America for governmental purposes without the payment of any royalties thereon or therefore.

BACKGROUND OF THE INVENTION

The present invention relates to an aircraft pylon noise control system, and more specifically, to an active aircraft pylon noise control system capable of reducing the overall noise of an aircraft by reducing noise associated with jet-flap interaction where the engine exhaust flow interacts with a trailing edge device (e.g., flaps or ailerons) or by redistributing noise sources and reducing jet source noise or by enhancing acoustic shielding of jet noise by an airframe surface of the aircraft.

Figure 1:
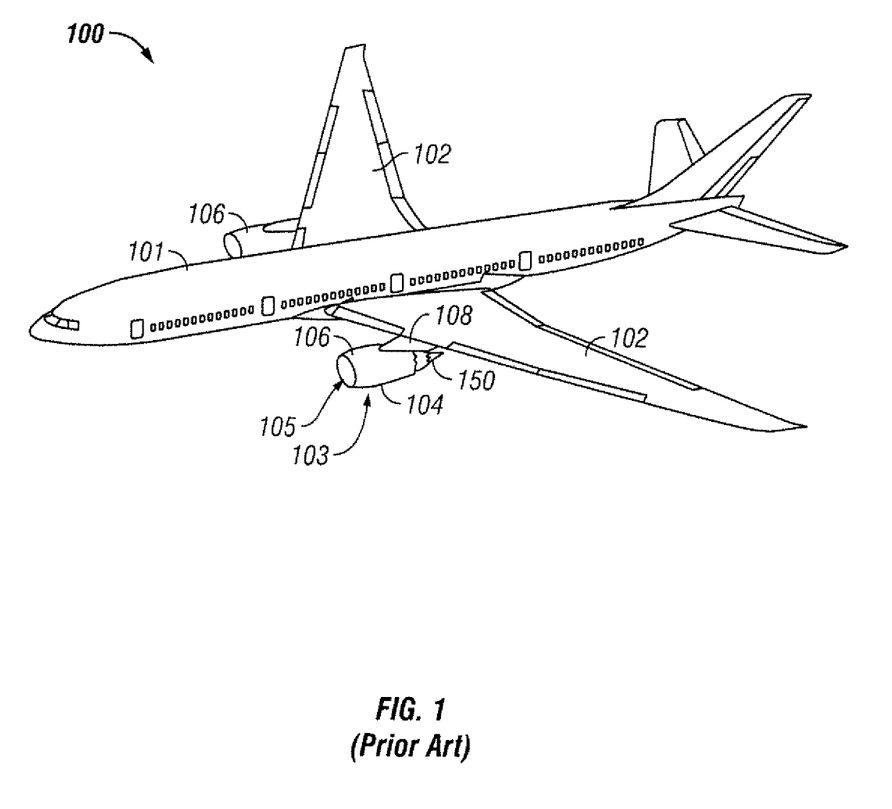
FIG. 1 illustrates a conventional aircraft.
Figure 2:
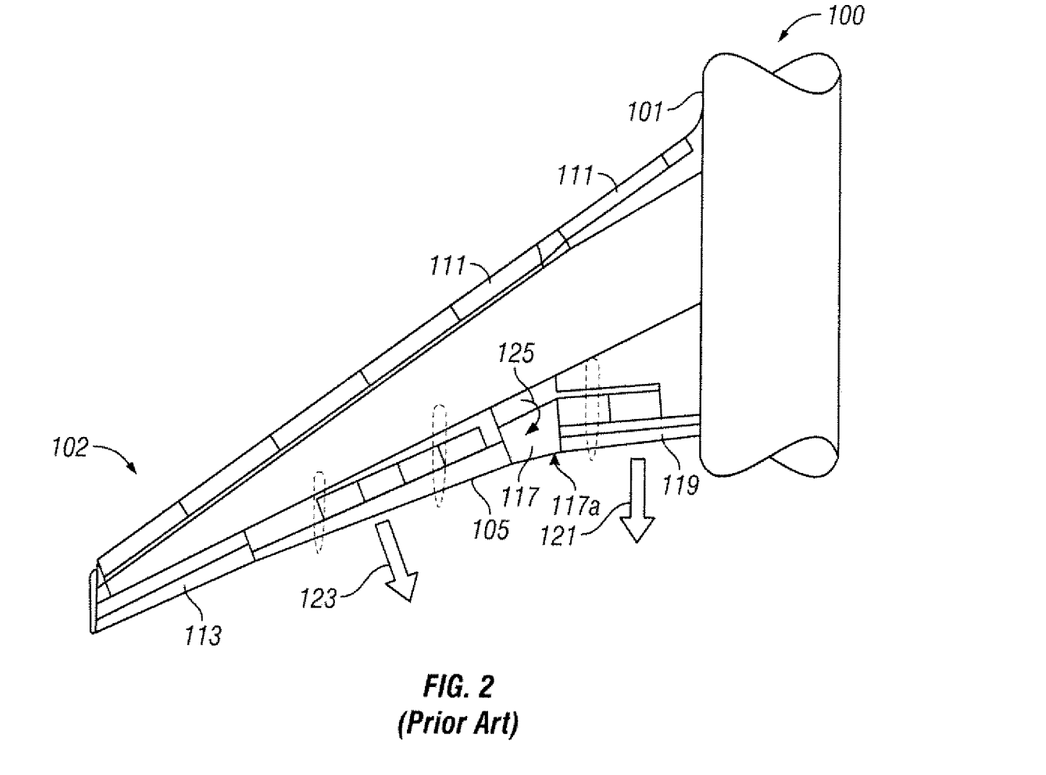
FIG. 2 illustrates a wing of the conventional aircraft shown in FIG. 1.

FIGS. 1 and 2 illustrate a conventional aircraft and an aircraft wing of the aircraft, respectively. As shown in FIG. 1, the aircraft 100 includes a fuselage 101, wings 102, and a propulsion engine system 103. The propulsion engine system 103 includes engines 106 at a lower surface of the wings 102. Each engine 106 is housed in a nacelle 104 having an inlet 105 and a nozzle system 150 attached to the wing 102 via a pylon structure 108. FIG. 2 shows high-lift devices included on the wing 102. The high lift devices may include deployable slats 111 positioned toward a leading edge of the wing 102 and multiple trailing edge devices positioned toward a trailing edge of the wing 102. The trailing edge devices include an outboard aileron 113, an outboard flap 105, an inboard aileron 117, and an inboard flap 119. The outboard and inboard ailerons 113 and 117 are typically used for roll control of the aircraft 100 while the outboard and inboard flaps 105 and 119 are used to control the lift of the aircraft 100 during takeoff and landing operations. The ailerons 113 and 117 are hinged devices that are un-gapped when in their deployed position. When the flaps 105 and 119 are deployed, they rotate and move in an aft direction to open a gap relative to the wing 102 (as depicted by arrows 121 and 123). Since the motion path of the inboard flap 119 (as indicated by arrow 121) converges with the motion path of the outboard flap 105, the inboard aileron 117 located between the flaps 105 and 119 may be a hinged device and does not move aft when deployed (as indicated by arrow 125). When a flaperon is used in place of the inboard aileron 117, it moves in an aft direction unlike the inboard aileron 117.

Aircraft noise continues to have a significant negative impact on the environment, e.g., on the air transportation system and the public, There are several factors that contribute to overall aircraft noise. These factors include the different operations (e.g., takeoff, approach, and cruise) of the aircraft 100. The level of noise may vary depending on the operation. For example, jet noise is typically higher during a takeoff operation. Further, shock cell noise may occur during a cruising operation of the aircraft 100 which may affect the passengers and crew aboard the aircraft 100. In addition, the interaction of the engine jet exhaust with a deployed high-lift device (e.g., flaps 105 and 119, or ailerons 113 and 117) is another source of noise and is accentuated based upon a configuration of the propulsion engine system 103.

Therefore, it is desirable to have an aircraft pylon noise control system capable of reducing jet-flap interaction noise and redistributing noise sources within the aircraft to enhance acoustic shielding by the aircraft.

SUMMARY OF THE INVENTION

According to an embodiment of the present invention, an active pylon noise system is provided. An active pylon noise control system for an aircraft includes a pylon structure connecting an engine system with an airframe surface of the aircraft and having at least one aperture to supply a gas or fluid therethrough, an intake portion attached to the pylon structure to intake a gas or fluid, a regulator connected with the intake portion via a plurality of pipes, to regulate a pressure of the gas or fluid, a plenum chamber formed within the pylon structure and connected with the regulator, and configured to receive the gas or fluid as regulated by the regulator, and a plurality of injectors in communication with the plenum chamber to actively inject the gas or fluid through the plurality of apertures of the pylon structure.

According to other embodiments of the present invention, an aircraft system includes the above-mentioned active pylon noise control system and a method for the same is also provided.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter, which is regarded as the invention, is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

The present invention describes an active pylon noise control system that can be implemented within existing pylon structures or new pylon structures of an aircraft. The active pylon noise control system of the present invention provides a method for actively injecting gas or fluid such as air through a pylon structure of the aircraft Details regarding the active pylon noise control system and the method will be discussed below with reference to FIGS. 3 through 6.

Figure 3:
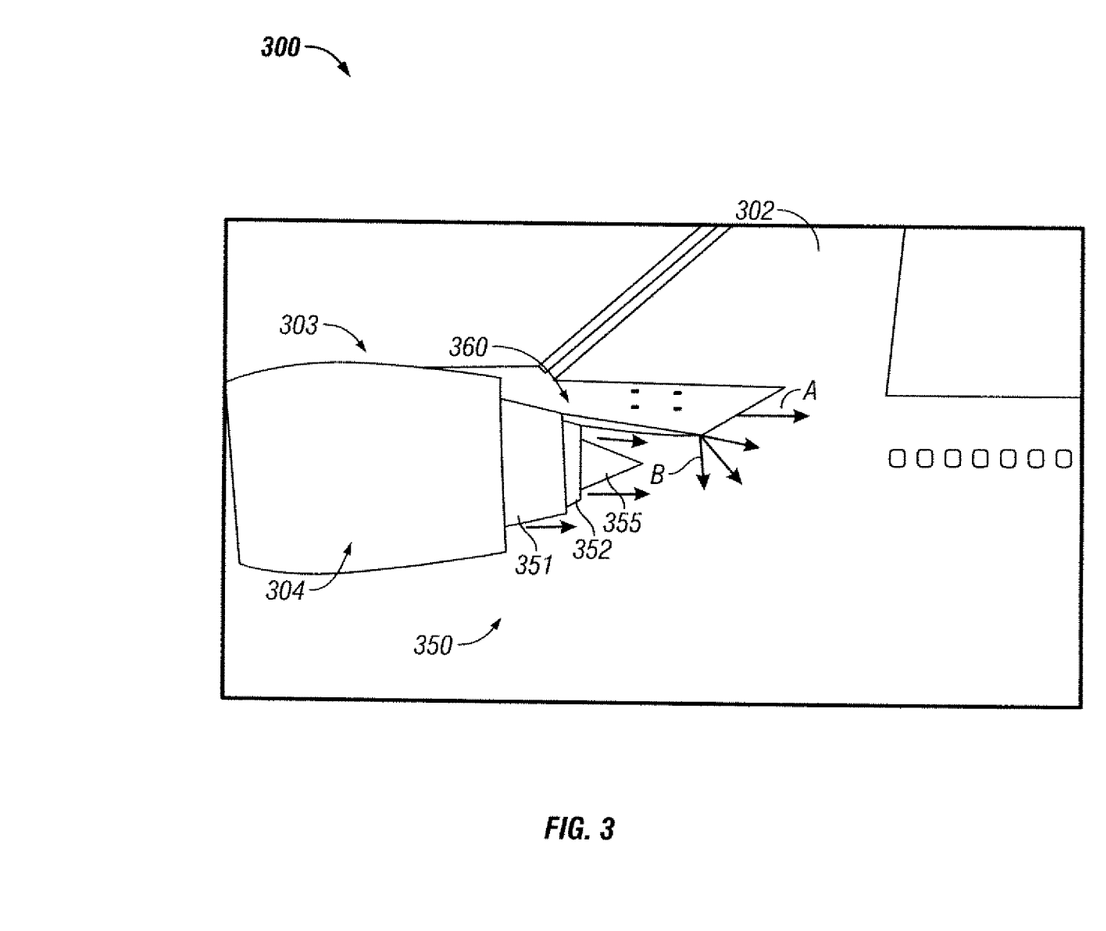
FIG. 3 is a partial schematic of a propulsion engine system that can be implemented within embodiments of the present invention.

FIG. 3 is a partial schematic of a propulsion engine system that can be implemented within embodiments of the present invention. As shown in FIG. 3, a portion 300 of an aircraft is provided. A wing 302 includes a propulsion engine system 303 attached thereto. The engine system 303 includes an engine (not shown) housed in a nacelle 304, and a nozzle system 350 for releasing exhaust flow from the engine. The nozzle system 350 includes a fan nozzle 351 configured to receive a fan flow from a fan (not shown) disposed adjacent to an engine disposed above an airframe surface (e.g., the wing 302) of the aircraft and a core nozzle 352 disposed within the fan nozzle 351 and configured to receive an engine core flow. The nozzle system 350 further includes a plug 355 formed within the core nozzle 352. According to an embodiment of the present invention, a pylon structure 360 is connected to the fan nozzle 351 and structurally attached with the wing 302 to secure the engine system 303 to the aircraft. In this embodiment of the present invention, the engine system 303 is attached to a lower surface of the wing 302, however the present invention is not limited hereto and the engine system 303 may be attached to an upper surface of the wing, the tail, the fuselage or to an upper surface of a hybrid body-wing configuration of an aircraft. The pylon noise control system of the present invention supplies a gas or fluid through the pylon structure 360 of the aircraft. According to an embodiment of the present invention, the fluid may be air or a gas mixture, water or other liquid. Details regarding the active pylon noise control system will now be discussed below with reference to FIGS. 3 through 5.

Figure 4:
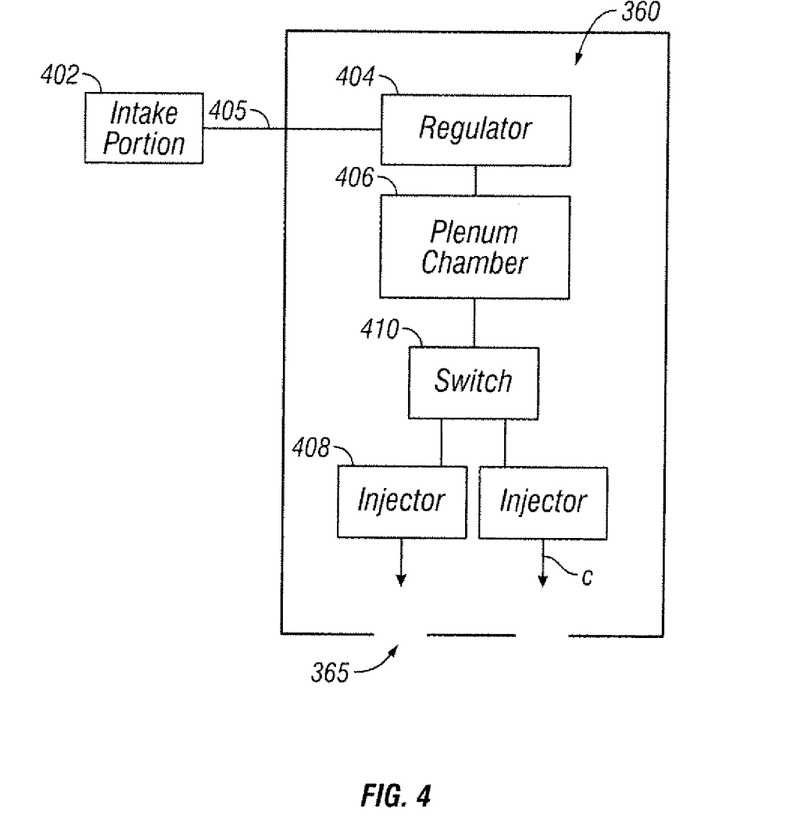
FIG. 4 is a diagram illustrating an active pylon noise control system that can be implemented within embodiments of the present invention.

FIG. 4 is a diagram illustrating an active pylon noise control system that can be implemented within embodiments of the present invention.

As shown in FIG. 4, the active pylon noise control system 400 includes the pylon structure 360 which comprises at least one aperture 365 (i.e., a slot or a plurality of apertures) to supply a gas or fluid therethrough. The noise control system 400 further includes an intake portion 402 attached to the pylon structure 360 and configured to intake a gas or fluid. According to an embodiment of the present invention, the intake portion 402 may be formed on at least one junction between the nacelle 304 and the pylon structure 360, on the side, upper surface or leading edge of the pylon structure 360, on the side or leading edge of the pylon structure that is interior (e.g., an upper bifurcator, not shown) to the nacelle 304, or on an inner surface of the nacelle 304. The intake of fluid from these surfaces can also result in drag reduction, an additional desirable aspect of the present invention.

The noise control system 400 further includes a regulator and/or pump 404 connected with the intake portion 402 via a pipe(s) 405, and is configured to regulate a pressure of the gas or fluid received from the intake portion 402. According to other embodiments of the present invention, a regulator and/or a pump is provided to control the pressure of the gas or fluid. Thus, the noise control system 400 may operate passively based on a higher pressure of gas or fluid from the intake flowing through the pipes 405 and where the pump may create an even higher pressure and also may control the pressure through the noise control system 400.

A plenum chamber 406 is also formed within the pylon structure 360 and is connected with the regulator and/or pump 404, and configured to receive the gas or fluid as regulated by the regulator and/or pump 404. The plenum chamber 406 is connected with and communicates with a plurality of injectors 408 configured to actively inject the gas or fluid through the apertures 365. The plenum chamber 406 distributes the gas or fluid so that it can be delivered to the injectors 408 in a uniform flow profile and pressure. The gas or fluid is then release from the injectors (Arrow C).

According to an embodiment of the present invention, a switch 410 is provided and attached to the plurality of injectors 408 to selectively direct the gas or fluid to at least one of the injectors 408.

According to an embodiment of the present invention, the aperture 365 is formed within a shelf surface or a trailing edge surface of the pylon structure 360. The gas or fluid is therefore injected through the shelf surface or the trailing edge surface as indicated by the arrows A and B shown in FIG. 3. An injection angle of the gas or fluid injected from the injectors 408 may be angled perpendicular to the exhaust flow direction or angled in a downstream direction or at an angle therebetween (Arrows B) if injected from the shelf surface or a heat shield of the pylon structure 360, or a trailing edge direction (i.e., a downstream direction) (Arrow A) if injected from the trailing edge surface of the pylon structure 360. The injection of the gas or fluid alters a trajectory of a flow of the core nozzle 352 and a flow of the fan nozzle 351, and impacts a mixing process of the flow of the core nozzle 352 and the flow of the fan nozzle 351. At cruise conditions, the invention can be used by adjusting the regulator and/or pump to inject very small levels of flow from the shelf, microblowing, in order to reduce drag associated with high-speed core flow scrubbing over the shelf surface.

According to an embodiment of the present invention, when an injector 408 is formed at the trailing edge surface of the pylon structure 360, the wake of the pylon structure 360 is affected by injecting a higher pressure and velocity of air through the respective injector 408 (arrow A depicted in FIG. 3). Further, since the mixing of the flow of the core nozzle 352 and of the fan nozzle 351 is changed, the strength and distribution of the aircraft noise sources is altered. The strengths of the aircraft noise sources are reduced and move upstream instead of downstream. Further, the overall trajectory of the aircraft is altered away from the high-lift devices (i.e., the flaps or ailerons) included on the wing 302. The present invention is not limited to the apertures 365 being formed on a shelf surface or trailing edge surface of the pylon structure 360. According to an embodiment of the present invention, the apertures 365 may be formed on a heat shield of the pylon structure. A detailed description will be discussed below with reference to FIG. 5

Figure 5:
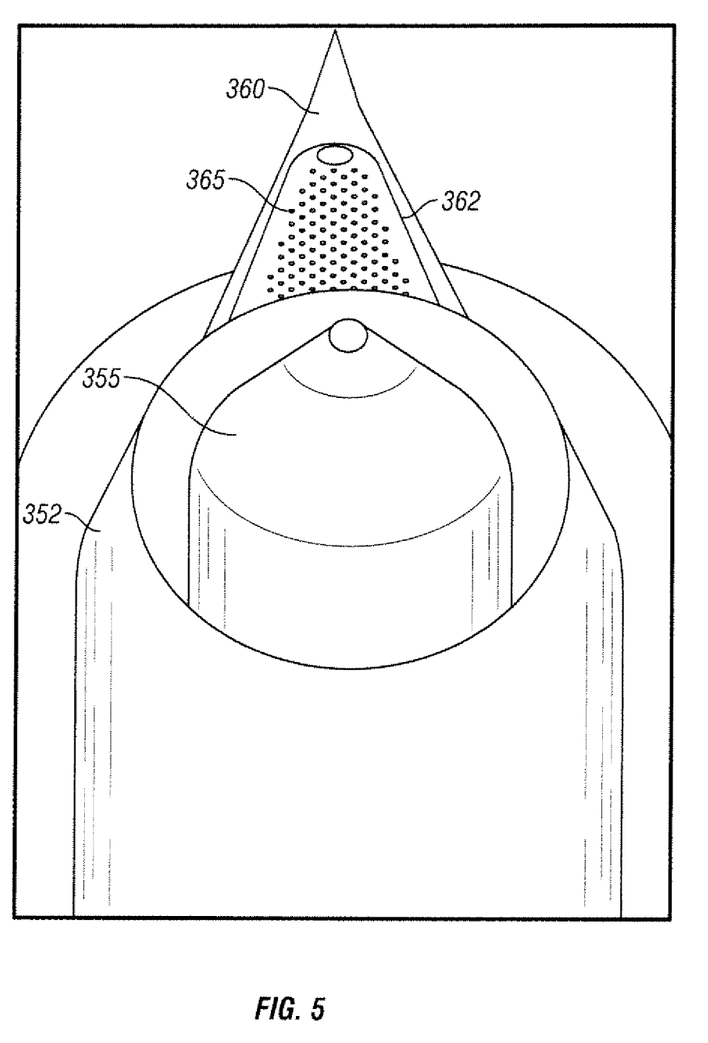
FIG. 5 is a schematic illustrating a heat shield formed on a pylon structure that can be implemented within other embodiments of the present invention.

FIG. 5 is a schematic illustrating a heat shield formed on the shelf of a pylon structure that can be implemented within other embodiments of the present invention. According to another embodiment of the present invention, the pylon structure 360 includes a heat shield 362. As shown in FIG. 5, an inner surface of the heat shield facing the core nozzle 352 includes a perforated surface that includes a plurality of apertures 365. The gas or fluid is therefore injected through the perforated surface.

Figure 6:
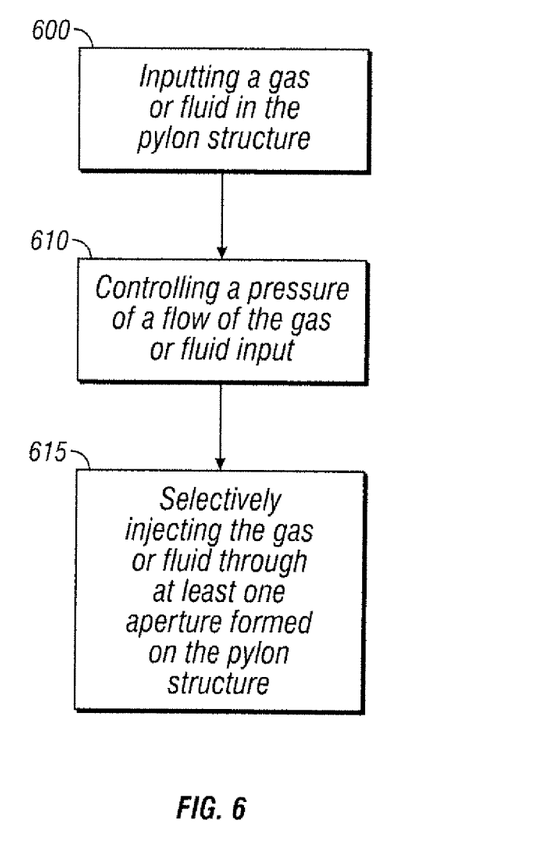
FIG. 6 is a flowchart illustrating a method for injecting a gas or fluid into a pylon structure of an aircraft that can be implemented within embodiments of the present invention.

FIG. 6 is a flowchart illustrating a method for injecting a gas or fluid into a pylon structure of an aircraft that can be implemented within embodiments of the present invention.

As shown in FIG. 6, at operation 600, a gas or fluid is input into the pylon structure 360 via the intake portion 402. From operation 600, the process continues to operation 610, where a pressure of the flow of the gas or fluid input in the pylon structure 360 is controlled via the regulator and/or pump 404. The gas or fluid is selectively injected, at operation 615, through at least one aperture 365 formed on the pylon structure 360, via the switch 410. This selection may involve injecting the gas or fluid through the shelf surface or the trailing edge surface of the pylon structure 360.

Embodiments of the present invention provide an active pylon noise control system that is capable of reducing overall aircraft noise by injecting air, for example, through a pylon structure attaching the engine system to the airframe surface of the aircraft. In this system, the flow rate of the air is adjustable at different operating points of the aircraft, and the system operates at relatively low pressures, typically less than approximately two atmospheres of pressure. The system is applicable to different aircraft configurations and may be implemented within existing pylon structures.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. It is therefore to be understood that, within the scope of the appended claims, the invention may be practiced other than as specifically described.

What is claimed as new and desired to be secured by Letters Patent of the United States is:

1. A method for injecting a gas or fluid from a pylon structure of an aircraft into an exhaust flow from a nozzle of an engine, the method comprising:
   inputting a gas or fluid in the pylon structure;
   controlling a pressure of a flow of the gas or fluid input in the pylon structure; and
   selectively injecting the gas or fluid through at least one aperture formed on the pylon structure aft of the nozzle of the engine.

2. The method of claim 1, wherein selectively injecting the gas or fluid comprises selectively directing the gas or fluid to at least one injector.

3. The method of claim 2, wherein selectively injecting the gas or fluid further comprises selecting injecting the gas or fluid through the at least one aperture formed at a shelf surface or a trailing edge surface of the pylon structure.

4. The method of claim 3, wherein an injection angle of the gas or fluid is an angle perpendicular to an exhaust flow direction or in a downstream direction or an angle therebetween if injected from the shelf surface or a heat shield of the pylon structure, or in a downstream direction if injected from the trailing edge surface of the pylon structure.

* * * * *